United States Patent
Paliwal et al.

(10) Patent No.: US 8,493,900 B2
(45) Date of Patent: Jul. 23, 2013

(54) IDLE MODE POWER CONSUMPTION REDUCTION IN WIRELESS COMMUNICATIONS

(75) Inventors: Vikas Paliwal, Old Bridge, NJ (US);
Xiaoxin Qiu, Bridgewater, NJ (US);
Zhijun (Nick) Gong, Iselin, NJ (US);
Rami Mehio, San Diego, CA (US);
Arun K. Visvanath, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 777 days.

(21) Appl. No.: 12/430,025

(22) Filed: Apr. 24, 2009

(65) Prior Publication Data
US 2010/0214968 A1    Aug. 26, 2010

Related U.S. Application Data

(60) Provisional application No. 61/155,482, filed on Feb. 25, 2009.

(51) Int. Cl.
*G08C 17/00* (2006.01)
*H04J 3/06* (2006.01)

(52) U.S. Cl.
USPC .......................................... 370/311; 370/350

(58) Field of Classification Search
USPC ........................................................ 370/311
See application file for complete search history.

(56) References Cited

U.S. PATENT DOCUMENTS

| | | | |
|---|---|---|---|
| 2004/0017777 A1* | 1/2004 | Chaudhuri et al. | 370/241 |
| 2004/0153679 A1* | 8/2004 | Fitton et al. | 713/322 |
| 2004/0166882 A1* | 8/2004 | He | 455/460 |
| 2006/0072515 A1* | 4/2006 | Suk et al. | 370/335 |
| 2009/0245230 A1* | 10/2009 | Sampath et al. | 370/350 |
| 2009/0274202 A1* | 11/2009 | Hanke et al. | 375/220 |

* cited by examiner

*Primary Examiner* — Derrick Ferris
*Assistant Examiner* — Kodzovi Acolatsa
(74) *Attorney, Agent, or Firm* — Garlick & Markison; Shayne X. Short

(57) ABSTRACT

Idle mode power consumption reduction in wireless communications. Within a wireless communication device that is operative to communicate with any one of a number of servicing cells, paging broadcasts from more than one of these servicing cells are received and undergo only a limited amount of processing before being stored for use in subsequent processing that may be performed later. This partitioned processing allows the turning off of certain components that are not needed and/or no longer needed for determining the system frame numbers associated with various servicing cells to effectuate timing synchronization. Certain modules within such a wireless communication device may perform processing using the full capabilities of the wireless communication device to generate initially processed signal, and then after such signals are stored, then only partial processing capability of the wireless communication device may be employed, even though perhaps being slower, to complete the processing.

20 Claims, 12 Drawing Sheets

IDLE MODE POWER CONSUMPTION REDUCTION IN WIRELESS COMMUNICATIONS

CROSS REFERENCE TO RELATED PATENTS/PATENT APPLICATIONS

Provisional Priority Claims

The present U.S. Utility Patent Application claims priority pursuant to 35 U.S.C. §119(e) to the following U.S. Provisional Patent Application which is hereby incorporated herein by reference in its entirety and made part of the present U.S. Utility Patent Application for all purposes:

1. U.S. Provisional Application Ser. No. 61/155,482, entitled "Idle mode power consumption reduction in wireless communications," filed Feb. 25, 2009, pending.

BACKGROUND OF THE INVENTION

1. Technical Field of the Invention

The invention relates generally to communication devices; and, more particularly, it relates to power management as may be implemented and performed within such communication devices.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), Enhanced Data rates for GSM Evolution (EDGE), General Packet Radio Service (GPRS), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to an antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

While transmitters generally include a data modulation stage, one or more IF stages, and a power amplifier, the particular implementation of these elements is dependent upon the data modulation scheme of the standard being supported by the transceiver. For example, if the baseband modulation scheme is Gaussian Minimum Shift Keying (GMSK), the data modulation stage functions to convert digital words into quadrature modulation symbols, which have a constant amplitude and varying phases. The IF stage includes a phase locked loop (PLL) that generates an oscillation at a desired RF frequency, which is modulated based on the varying phases produced by the data modulation stage. The phase modulated RF signal is then amplified by the power amplifier in accordance with a transmit power level setting to produce a phase modulated RF signal.

As another example, if the data modulation scheme is 8-PSK (phase shift keying), the data modulation stage functions to convert digital words into symbols having varying amplitudes and varying phases. The IF stage includes a phase locked loop (PLL) that generates an oscillation at a desired RF frequency, which is modulated based on the varying phases produced by the data modulation stage. The phase modulated RF signal is then amplified by the power amplifier in accordance with the varying amplitudes to produce a phase and amplitude modulated RF signal.

As yet another example, if the data modulation scheme is x-QAM (16, 64, 128, 256 quadrature amplitude modulation), the data modulation stage functions to convert digital words into Cartesian coordinate symbols (e.g., having an in-phase signal component and a quadrature signal component). The IF stage includes mixers that mix the in-phase signal component with an in-phase local oscillation and mix the quadrature signal component with a quadrature local oscillation to produce two mixed signals. The mixed signals are summed together and filtered to produce an RF signal that is subsequently amplified by a power amplifier.

Within wireless communication systems, there is typically a requirement to maintain a timing reference for transmitting and receiving the control information and data. Many such wireless communication systems utilize a frame based timing synchronization for this purpose. Accordingly, a System Frame Number (SFN) is associated with each frame in such a system. For instance, in the Wideband Code Division Multiple Access (WCDMA) systems, an access terminal is required to determine the System Frame Number (SFN) of its serving cell as well as its neighbor cells on a periodic basis and report it back to the communication network.

In order to economize on power consumption, access terminals typically employ some form of Discontinuous Reception (DRX) technique. A typical DRX mechanism involves turning Radio Frequency (RF) circuitry; baseband hardware accelerators and host processor off for most of the time (sleep duration) and turned on only periodically to monitor the paging information sent on specific paging occasions (wakeup periods). However, this requirement to monitor the SFN necessitates that access terminal keeps the components on for an undesirably long duration. This extended wakeup duration is often very long due to the length of cell lists for cells whose SFNs needs to be monitored. Keeping a wireless communication device awake for such long periods of time can significantly drain the energy of a wireless communication device, which is particularly undesirable in the context of personal wireless communication systems. There does not exist any means in the art for monitoring such servicing cell lists in an effective manner.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

As also mentioned above with respect to background of the related art, within wireless communication systems, there is typically a requirement to maintain a timing reference for transmitting and receiving the control information and data. Herein, various means are presented by which the requisite wakeup duration needed to ascertain system frame numbers (SFNs) for various servicing cells perform timing synchronization is significantly reduced within a wireless communication device. By doing so, the energy (e.g., battery life) of such a wireless communication device may be significantly extended. In one embodiment, by storing the broadcasted information during paging occasions for all cells in a parallel manner and processing them later using a much reduced hardware set facilitates significant reduction in power consumption towards SFN evaluation.

In one possible embodiment, the paging broadcasts received by a wireless communication device initially undergo a portion of parallel processing to generate processed signals that are stored. Later on, using a much reduced hardware set, those stored signals undergo processing in a less than fully parallel manner (e.g., serial in one instance) to ascertain the SFNs for use in accordance with timing synchronization. Also, by turning off certain of the highest current consuming modules within the wireless communication device (i.e., those that typically consume the most power), the battery life of a wireless communication device can be extended significantly.

Figure 1:
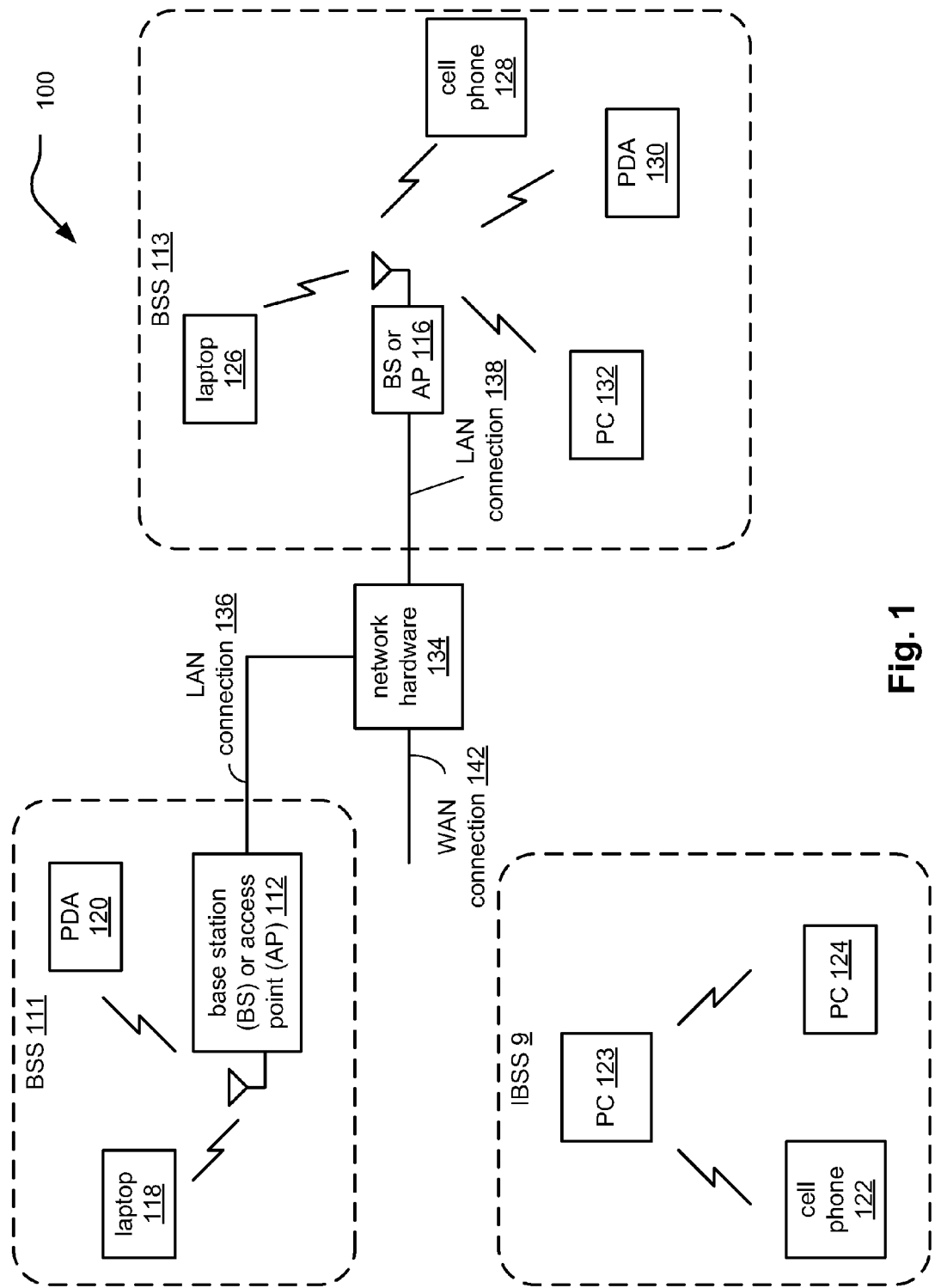
FIG. 1 is a diagram illustrating an embodiment of a wireless communication system.

FIG. 1 is a diagram illustrating an embodiment of a wireless communication system 100. The wireless communication system 100 includes a plurality of base stations and/or access points 112, 116, a plurality of wireless communication devices 118-132 and a network hardware component 134. Note that the network hardware 134, which may be a router, switch, bridge, modem, system controller, etc. provides a wide area network connection 142 for the communication system 100. Further note that the wireless communication devices 118-132 may be laptop host computers 118 and 126, personal digital assistant hosts 120 and 130, personal computer hosts 124 and 132 and/or cellular telephone hosts 122 and 128.

Wireless communication devices 122, 123, and 124 are located within an independent basic service set (IBSS) area and communicate directly (i.e., point to point). In this configuration, these devices 122, 123, and 124 may only communicate with each other. To communicate with other wireless communication devices within the system 100 or to communicate outside of the system 100, the devices 122, 123, and/or 124 need to affiliate with one of the base stations or access points 112 or 116.

The base stations or access points 112, 116 are located within basic service set (BSS) areas 111 and 113, respectively, and are operably coupled to the network hardware 134 via local area network connections 136, 138. Such a connection provides the base station or access point 112-116 with connectivity to other devices within the system 100 and provides connectivity to other networks via the WAN connection 142. To communicate with the wireless communication devices within its BSS 111 or 113, each of the base stations or access points 112-116 has an associated antenna or antenna array. For instance, base station or access point 112 wirelessly communicates with wireless communication devices 118 and 120 while base station or access point 116 wirelessly communicates with wireless communication devices 126-132. Typically, the wireless communication devices register with a particular base station or access point 112, 116 to receive services from the communication system 100.

Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio.

Figure 2:
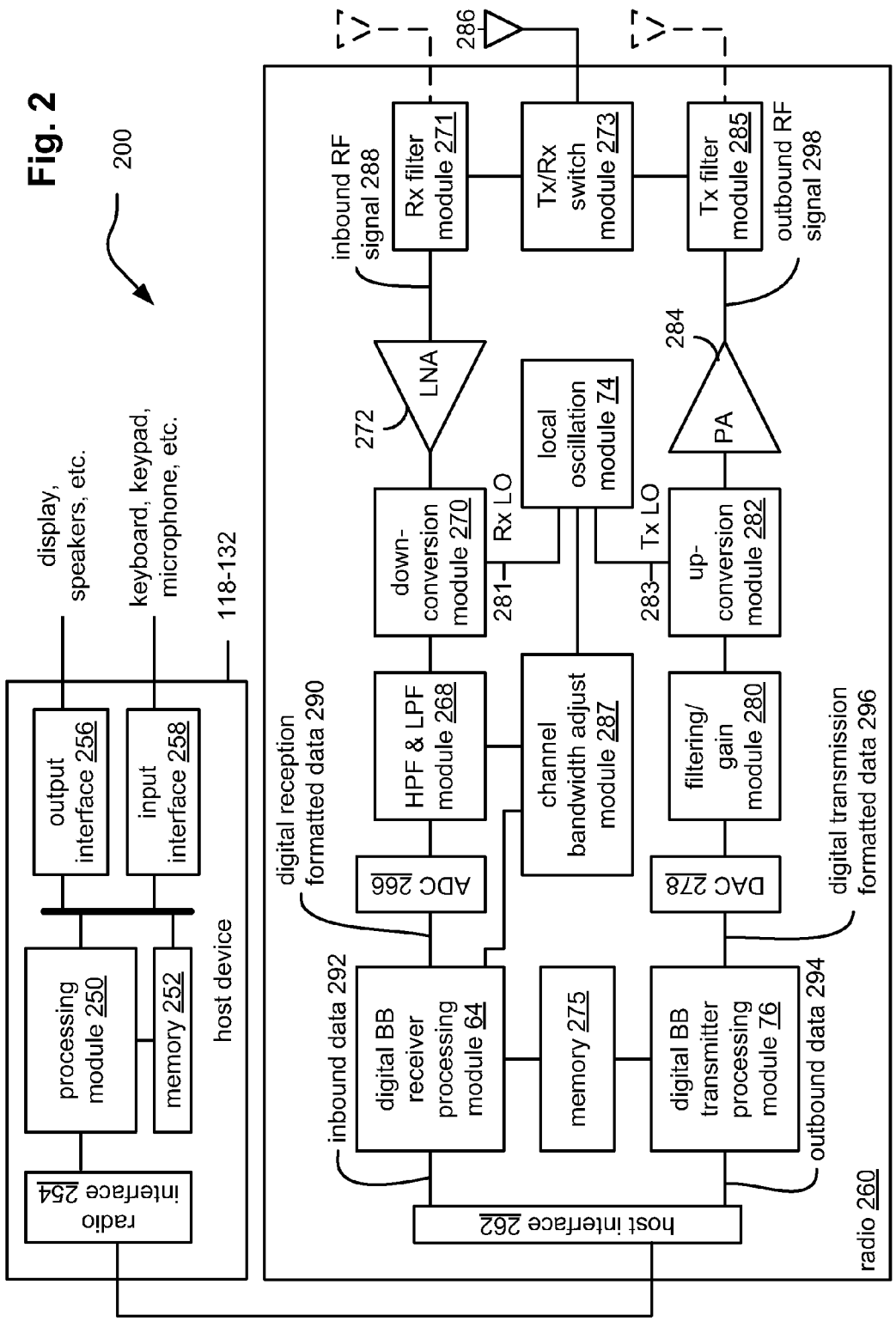
FIG. 2 is a diagram illustrating an embodiment of a wireless communication device.

FIG. 2 is a diagram illustrating an embodiment of a wireless communication device 200 that includes the host device 118-132 and an associated radio 260. For cellular telephone hosts, the radio 260 is a built-in component. For personal digital assistants hosts, laptop hosts, and/or personal computer hosts, the radio 260 may be built-in or an externally coupled component.

As illustrated, the host device 118-132 includes a processing module 250, memory 252, a radio interface 254, an input interface 258, and an output interface 256. The processing module 250 and memory 252 execute the corresponding instructions that are typically done by the host device. For example, for a cellular telephone host device, the processing module 250 performs the corresponding communication functions in accordance with a particular cellular telephone standard.

The radio interface 254 allows data to be received from and sent to the radio 260. For data received from the radio 260 (e.g., inbound data), the radio interface 254 provides the data to the processing module 250 for further processing and/or routing to the output interface 256. The output interface 256 provides connectivity to an output display device such as a display, monitor, speakers, et cetera such that the received data may be displayed. The radio interface 254 also provides data from the processing module 250 to the radio 260. The processing module 250 may receive the outbound data from an input device such as a keyboard, keypad, microphone, et cetera via the input interface 258 or generate the data itself. For data received via the input interface 258, the processing module 250 may perform a corresponding host function on the data and/or route it to the radio 260 via the radio interface 254.

Radio 260 includes a host interface 262, digital receiver processing module 264, an analog-to-digital converter 266, a high pass and low pass filter module 268, an IF mixing down conversion stage 270, a receiver filter 271, a low noise amplifier 272, a transmitter/receiver switch 273, a local oscillation module 274, memory 275, a digital transmitter processing module 276, a digital-to-analog converter 278, a filtering/gain module 280, an IF mixing up conversion stage 282, a power amplifier 284, a transmitter filter module 285, a channel bandwidth adjust module 287, and an antenna 286. The antenna 286 may be a single antenna that is shared by the transmit and receive paths as regulated by the Tx/Rx switch 273, or may include separate antennas for the transmit path and receive path. The antenna implementation will depend on the particular standard to which the wireless communication device 200 is compliant.

The digital receiver processing module 264 and the digital transmitter processing module 276, in combination with operational instructions stored in memory 275, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 264 and 276 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 275 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 264 and/or 276 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 260 receives outbound data 294 from the host device via the host interface 262. The host interface 262 routes the outbound data 294 to the digital transmitter processing module 276, which processes the outbound data 294 in accordance with a particular wireless communication standard (e.g., IEEE 802.11, Bluetooth, ZigBee, any other type of radio frequency based network protocol and/or variations thereof et cetera) to produce outbound baseband signals 296. The outbound baseband signals 296 will be digital base-band signals (e.g., have a zero IF) or digital low IF signals, where the low IF typically will be in the frequency range of one hundred kHz (kilo-Hertz) to a few MHz (Mega-Hertz).

The digital-to-analog converter 278 converts the outbound baseband signals 296 from the digital domain to the analog domain. The filtering/gain module 280 filters and/or adjusts the gain of the analog signals prior to providing it to the IF mixing stage 282. The IF mixing stage 282 converts the analog baseband or low IF signals into RF signals based on a transmitter local oscillation 283 provided by local oscillation module 274. The power amplifier 284 amplifies the RF signals to produce outbound RF signals 298, which are filtered by the transmitter filter module 285. The antenna 286 transmits the outbound RF signals 298 to a targeted device such as a base station, an access point and/or another wireless communication device 200.

The radio 260 also receives inbound RF signals 288 via the antenna 286, which were transmitted by a base station, an access point, or another wireless communication device. The antenna 286 provides the inbound RF signals 288 to the receiver filter module 271 via the Tx/Rx switch 273, where the Rx filter 271 bandpass filters the inbound RF signals 288. The Rx filter 271 provides the filtered RF signals to low noise amplifier 272, which amplifies the signals 288 to produce an amplified inbound RF signals. The low noise amplifier 272 provides the amplified inbound RF signals to the IF mixing module 270, which directly converts the amplified inbound RF signals into an inbound low IF signals or baseband signals based on a receiver local oscillation 281 provided by local oscillation module 274. The down conversion module 270 provides the inbound low IF signals or baseband signals to the filtering/gain module 268. The high pass and low pass filter module 268 filters, based on settings provided by the channel bandwidth adjust module 287, the inbound low IF signals or the inbound baseband signals to produce filtered inbound signals.

The analog-to-digital converter 266 converts the filtered inbound signals from the analog domain to the digital domain to produce inbound baseband signals 290, where the inbound baseband signals 290 will be digital base-band signals or digital low IF signals, where the low IF typically will be in the frequency range of one hundred kHz to a few MHz. The digital receiver processing module 264, based on settings provided by the channel bandwidth adjust module 287, decodes, descrambles, demaps, and/or demodulates the inbound baseband signals 290 to recapture inbound data 292 in accordance with the particular wireless communication standard being implemented by radio 260. The host interface 262 provides the recaptured inbound data 292 to the host device 118-132 via the radio interface 254.

As the reader will appreciate, the wireless communication device 200 of FIG. 2 may be implemented using one or more integrated circuits. For example, the host device may be implemented on one integrated circuit, the digital receiver processing module 264, the digital transmitter processing module 276 and memory 275 may be implemented on a second integrated circuit, and the remaining components of the radio 260, less the antenna 286, may be implemented on a third integrated circuit. As an alternate example, the radio 260 may be implemented on a single integrated circuit. As yet another example, the processing module 250 of the host device and the digital receiver and transmitter processing modules 264 and 276 may be a common processing device implemented on a single integrated circuit. Further, the memory 252 and memory 275 may be implemented on a single integrated circuit and/or on the same integrated circuit as the common processing modules of processing module 250 and the digital receiver and transmitter processing module 264 and 276.

Figure 3:
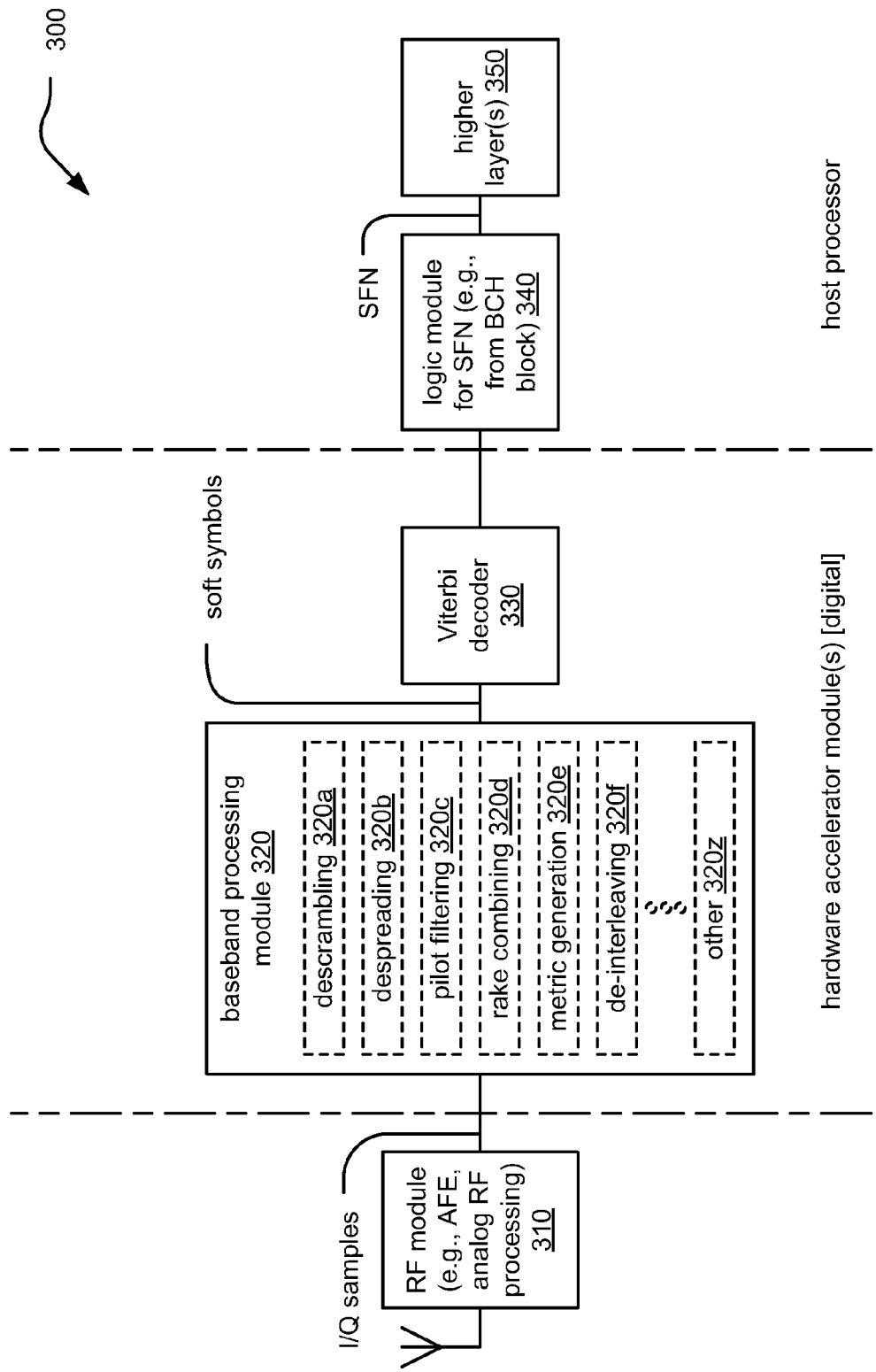
FIG. 3 is a diagram illustrating an alternative embodiment of a wireless communication device.

FIG. 3 is a diagram illustrating an alternative embodiment of a wireless communication device 300. The diagram also captures the three primary subsystems in a typical mobile station (i.e., wireless communication device): an RF module, one or more hardware accelerator modules, and a host processor module.

A radio frequency (RF) module 310 receives signals transmitted to the wireless communication device 300. The RF module 310 may be coupled to one or more antennae (e.g., in a rake finger and/or multiple-in/multiple-out (MIMO) type configuration) to effectuate the receipt signals transmitted to the wireless communication device 300. In the RF module 310, the analog processing for incoming RF signals is processed in the analog domain in a separate RF card or an integrated RF circuit.

This RF module 310 may be viewed as being an analog front end (AFE) module or a module that performs analog RF processing and may perform any of a variety of operations including any one of digital to analog conversion (e.g., sampling), gain adjustment, filtering, frequency conversion, etc. The in-phase and quadrature (I/Q) samples generated by the RF module 310 are passed to a baseband processing module 320. These I/Q samples may be viewed as being demodulated signals in some embodiments.

These in-phase and quadrature phase (I/Q) samples are fed to hardware accelerator portion that includes a baseband processing module 320 that is operative to perform one or more of a variety of operations, including descrambling 320a, despreading 320b, pilot filtering 320c, rake combining 320d (e.g., when the wireless communication device 300 includes a rake finger configuration), metric generation 320e (e.g., when various constellation types are employed), de-interleaving 320f, and/or any other appropriate processing within such a baseband processing module 320.

Soft symbols are generated by the baseband processing module 320 and passed to a Viterbi decoder module 330 that processes the soft symbols. In this embodiment, the last leg of this path in hardware is done by the Viterbi decoder module 330 that processes the soft symbols and produces the broadcast channel's (BCH) transport block. The host processor [that includes a logic module for SFN 340] on the system reads out specific bits related to SFN from this BCH transport block and deciphers the SFN from it and passes onto one or more higher layers, as shown by reference numeral 350.

It has to be noted that for a BCH transport block, due to a relatively moderate spreading factor, the bulk of heavy processing is performed unto the soft symbols and decoding can easily be done later on (e.g., in the software domain in one embodiment). Also, due to fewer soft symbols generated by a BCH transport block, the memory requirements for a servicing cell's BCH transport block is far less compared to a typical data channel. Therefore post-processing of BCH's soft symbols is a viable option. On the contrary, storing I/Q samples and post-processing on them may be impractical from a memory and processing standpoint for certain applications.

Figure 4:
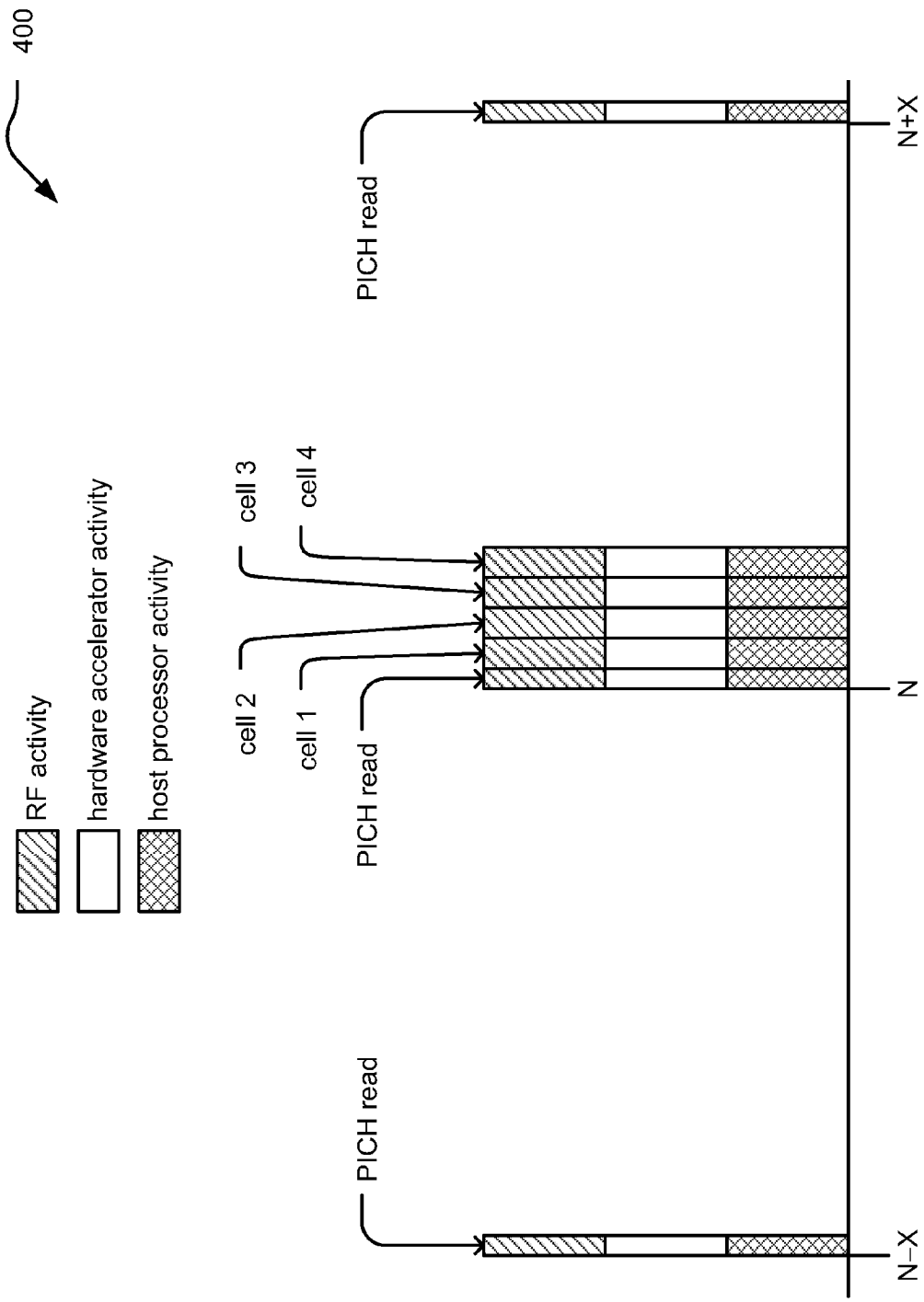
FIG. 4 is a diagram illustrating an embodiment of timing diagram showing impact of system frame number (SFN) reads on a wireless communication device.

FIG. 4 is a diagram illustrating an embodiment of timing diagram 400 showing impact of system frame number (SFN) reads on a wireless communication device. As mentioned earlier, a mobile station (e.g., wireless communication device) capable of sleep mode operation utilizes a discontinuous reception (DRX) technique as depicted in this diagram.

In particular, considering one particular case, for a sample DRX cycle of length 64 frames (e.g., X=64 as depicted in the diagram for such a case, though clearly X may have other values), the User Equipment (UE) on the mobile station wakes up periodically every 64 frames to read the paging information available on the Paging Indicator Channel (PICH). It can be seen in the diagram that at frame numbers N−X (i.e., N−64 in this example) and N+X (i.e., N+64 in this example), the UE is awake just for 1-2 frames simply to perform the read of the PICH information.

However, very often the UE is required to read SFNs on several servicing cells (the one servicing cell actually serving that particular UE and neighbor servicing cells) and evaluate differences between the serving cell's SFN and the neighbor cells' SFNs. The frame offsets of the actual serving cell and the neighbor cells are reported to the higher layers for further processing.

In one embodiment, the UE reads the SFN on individual cells one-by-one and updates the frame offsets as shown at frame number N. Also, an exemplary UE device would require up to 3 frames for blind detection of a cell's SFN and 2 frames for a verification of a known SFN frame offset. Blind detection in this context refers to case where the SFN of a cell is being decoded for the first time. Accordingly, for a neighbor cell list of size M, this translates to an extra awake period of 2M to 3M frames. This diagram shows an extra wakeup period of about 8 frames around frame N, entirely due to SFN evaluation, which is about 16% of the sleep cycle for this case and a roughly 4 fold increase in power consumption per DRX cycle. It is notable that an exemplary device, as shown in this diagram, would require all the three components—RF circuitry, hardware accelerator and host processor to process the incoming signal for this extra duration.

In other words, all of the components of the wireless communication device would be fully energized and operable during this extended duration. This is highly consumptive of the energy of the wireless communication device, which can be particularly undesirable when the wireless communication device is operating on battery power.

Figure 5:
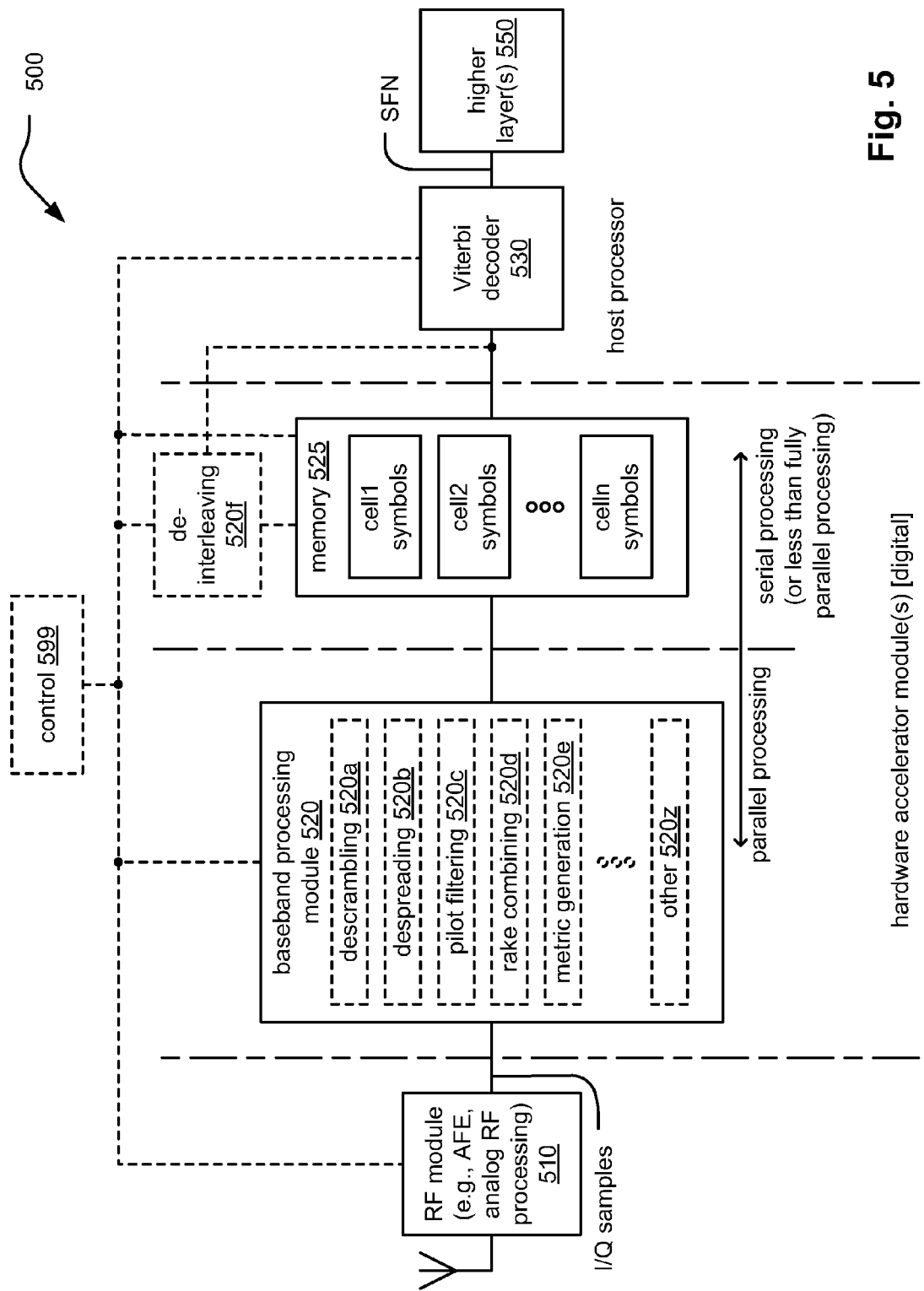
FIG. 5 is a diagram illustrating an alternative embodiment of a wireless communication device.

FIG. 5 is a diagram illustrating an alternative embodiment of a wireless communication device 500. The embodiment of this diagram also captures the three primary subsystems in a typical mobile station (i.e., wireless communication device): an RF module, one or more hardware accelerator modules, and a host processor module. However, the partitioning of these three primary subsystems may be effectuated differently than in previous embodiments.

A radio frequency (RF) module 510 receives signals transmitted to the wireless communication device 500. The RF module 510 may be coupled to one or more antennae (e.g., in a rake finger and/or MIMO type configuration) to effectuate the receipt signals transmitted to the wireless communication device 500. In the RF module 510, the analog processing for incoming RF signals is processed in the analog domain in a separate RF card or an integrated RF circuit.

This RF module 510 may be viewed as being an analog front end (AFE) module or a module that performs analog RF processing and may perform any of a variety of operations including any one of digital to analog conversion (e.g., sampling), gain adjustment, filtering, frequency conversion, etc. The in-phase and quadrature (I/Q) samples generated by the RF module 510 are passed to a baseband processing module 520. These I/Q samples may be viewed as being demodulated signals in some embodiments. It is also noted that in this embodiment and others, there need not necessarily be separate I/Q streams, and a wireless communication device that operates only one stream (e.g., I stream only or Q stream only), using some form of parallel processing therein, may also be viewed as generating demodulated signals as well.

In this embodiment, these in-phase and quadrature phase (I/Q) samples are fed to a hardware accelerator portion that includes a baseband processing module 520 that is operative to perform one or more of a variety of operations, including descrambling 520a, despreading 520b, pilot filtering 520c, rake combining 520d (e.g., when the wireless communication device 500 includes a rake finger configuration), metric generation 520e (e.g., when various constellation types are employed), and/or any other appropriate processing within such a baseband processing module 520. In certain embodiments, the de-interleaving 520f may be performed in a serial manner. Therefore, in this embodiment, the de-interleaving 520f is shown as being performed independently and separately from certain other of the operations performed within the baseband processing module 520.

Up to this point, processing within the wireless communication device 500 is performed in accordance with parallel processing. Thereafter, processing within the wireless communication device 500 is performed in accordance with serial processing or less than fully parallel processing (e.g., partial parallel processing).

The hardware accelerator portion of this embodiment also includes a memory module 525 that is operative to store the various soft symbols generated within another part of the hardware accelerator portion (e.g., in the baseband processing module 520 of this embodiment).

As mentioned above, paging broadcasts multiple servicing cells (i.e., the actual serving cell and one or more neighboring cells) are monitored and processed to generate the appropriate SFNs for use in timing synchronization. As such, in this embodiment, the soft symbols for each of these servicing cells are stored in the memory module 525. This embodiment shows separate partitioning of the soft symbols for each of these servicing cells in the memory module 525, though an appropriate addressing scheme could also be employed if desired to store them differently.

Herein, the DRX wakeup periods are considerably reduced by performing the computationally intensive processing in a parallel fashion and storing the processed information. This stored information is processed later in an offline, serial fashion (or less than fully parallel fashion), each of this offline processing being very light in terms of computational intensity, so that it can be performed by the host processor module itself. This is achieved by making use of all idle resources in an exemplary UE architecture during paging broadcasts occasions and putting the RF circuitry and other hardware blocks to sleep as soon as possible.

In a typical implementation, each rake finger has its own descrambling, dispreading, pilot filtering, etc. blocks. The serving cell typically has fewer multi-paths with good signal energies available than the number of fingers in an exemplary design. Further, the paging indicator channel (PICH) does not require de-interleaving at all. In one embodiment, for performing SFN decodes, these idle fingers of a rake finger configuration are employed in a concurrent fashion for individual cells, and enhanced control for a serial usage of de-interleaving 520f is achieved for each cell. This is illustrated in the embodiment of FIG. 5.

Figure 6:
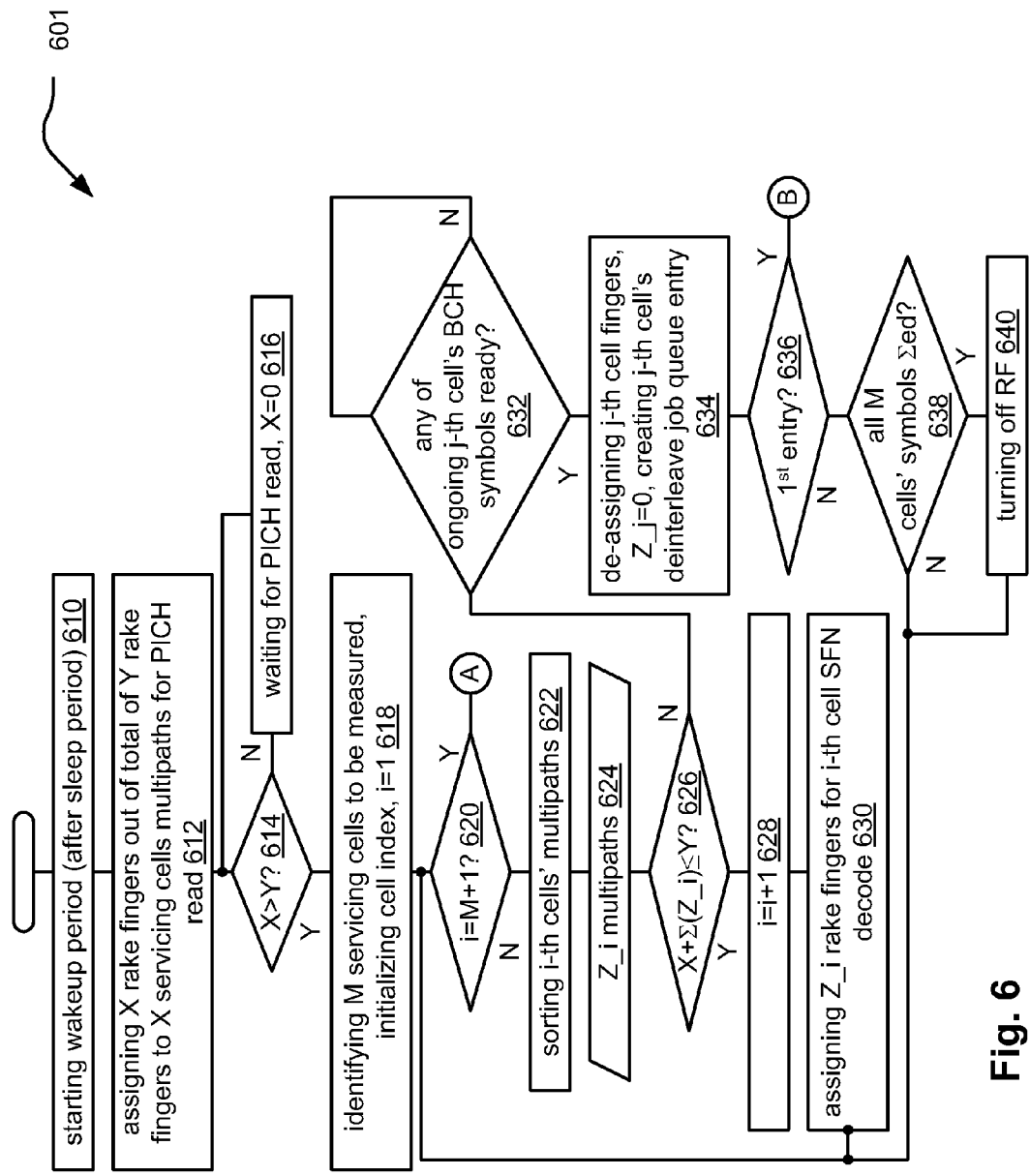
FIG. 6 and FIG. 7, when considered together, is a diagram illustrating an embodiment of a method for performing SFN decoding on multiple servicing cells.
Figure 7:
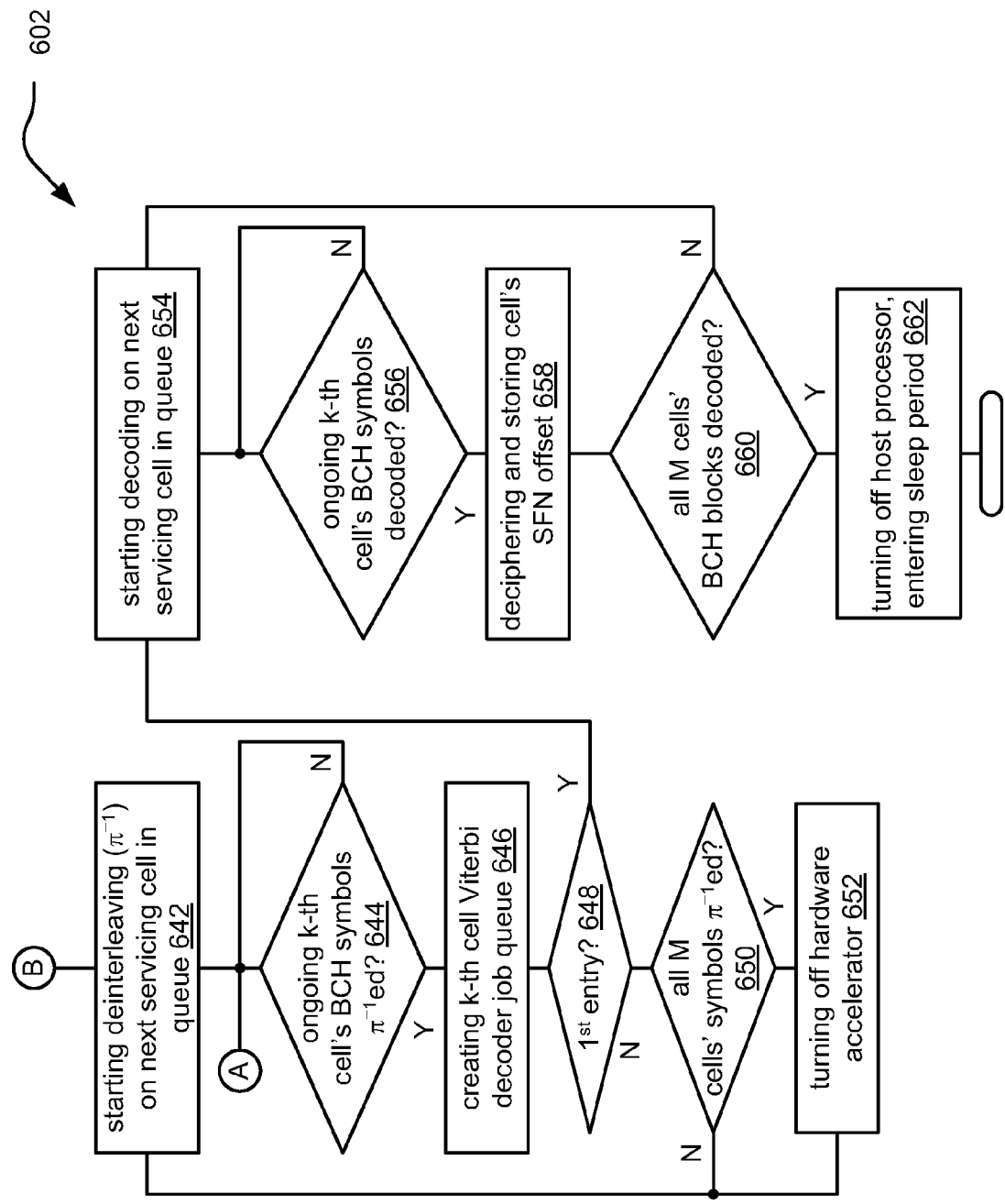

As shown in FIG. 5 and the combination of FIG. 6 and FIG. 7, separate fingers are assigned to individual cells for several multipaths, in parallel with serving cells' fingers for PICH reading. The fingers for each of the cells do the descrambling, dispreading and pilot filtering on incoming I/Q samples.

The fingers of a cell use the existing combining methodology to produce the combined symbols. These symbols are written in separate memory locations. The exemplary UE designs are provisioned for very high symbol rate and PICH symbol rate in a DRX wakeup cycle is negligible. Consequently, no additional memory is required for simultaneously storing M sets of BCH symbols for M cells, as a broadcast channel's symbol rate is about $\frac{1}{32}$ of the maximum supported symbol rates on exemplary UEs.

Once all the symbols of measured cells' BCH blocks are then ready, and the RF module 510 (and all circuitry associated therewith) can be completely turned off and all the processing can be done off-line using the hardware accelerator module and/or host processor, offering significant advantage of saving power by turning the RF module 510 off much earlier than existing designs within the art.

Further, once all the soft symbols of a cell are ready, de-interleaving 520f on individual cells can be done by either the hardware accelerator portion or instead in software in an alternative embodiment. Of course, if the de-interleaving 520f would be desired to be performed in a similar manner as other of the operations performed within the baseband processing module 520, it could of course be emplaced within the baseband processing module 520. The de-interleaving 520f may be performed in the serial (or less than fully parallel processing) portion of the wireless communication device 500.

The soft symbols are output from the memory module 525 (with or without having undergone de-interleaving 520f, whichever is appropriate for a particular application) are then passed to a host processor module that performs Viterbi decoding using a Viterbi decoder module 530 therein. The relatively modest requirements of Viterbi decoding for broadcast channel (BCH) transport blocks of different cells can be met in a serial manner in either appropriately designed hardware or within software of an appropriately designed embodiment. In a hardware application, an added advantage of turning off the entire hardware accelerator may be performed once the symbols for all measured cells are ready.

FIG. 6 and FIG. 7, when considered together, is a diagram illustrating an embodiment of a method 601/602 for performing SFN decoding on multiple servicing cells. FIG. 6 and FIG. 7, when considered together, shows the details of logic to be applied in proposed approach for fast system frame number (SFN) decoding. The method 601/602 leverages from unused rake fingers in a wakeup duration. Even if all available fingers are used for PICH monitoring (i.e., and unavailable for other uses during those periods), this approach utilizes optimal rake finger allocation to fetch BCH symbols in an extremely fast manner. Further, if all fingers are utilized and some cells are left over, this method 601/602 can be utilized in a pipelined fashion to evaluate the SFNs on the serving and neighbor cells.

FIG. 6 and FIG. 7, when considered together, can also be seen splitting the use of all three components of a mobile station (e.g., RF circuitry, hardware accelerator and host processor) into three step logical optimization of turning these components off as soon they are no longer required. This is accomplished by effectively storing and passing on information from one component to other, with no extra overhead on memory required for storage due to well-provisioned UE architecture designed for data rates much higher than broadcast channel (BCH).

The method 601/602 begins by starting a wakeup period (after a sleep period) as shown in a block 610. Then, the method 601/602 continues by assigning X rake fingers out of a total of Y available rake fingers to X servicing cells multipaths for PICH read, as shown in a block 612.

As shown in a decision block 614, if it is determined that X<Y, then the method 601/602 continues by waiting for a PICH read, and as such X=0 in this case, as shown in a block 616. Alternatively, if it is determined that X>Y, then the method 601/602 continues by identifying M servicing cells to be measured, and initializing the cell index, I, to be 1, as shown in a block 618.

As shown in a decision block 620, if it is determined that i=M+1, then the method 601/602 continues by moving to the operations described by A in FIG. 7.

However, as shown in the decision block 620, if it is determined that i≠M+1, then the method 601/602 continues by sorting the i-th cells' multipaths as shown in a block 622, and then setting Z_i multipaths, as shown in a block 624.

As shown in a decision block 626, if it is determined whether X plus the sum of all Z_i is less than or equal to Y. If X plus the sum of all Z_i is less than or equal to Y, then the method 601/602 continues by incrementing I by one, as shown in a block 628, and assigning the Z_i rake fingers for the i-th cell SFN decode, as shown in a block 630, and then returning to the decision block 620.

Alternatively, if X plus the sum of all Z_i is greater than Y, then the method 601/602 continues by proceeding to decision block 632 where it is determined in any of the ongoing j-th cell's BCH symbols are ready. If none of the ongoing j-th cell's BCH symbols are ready, then the method 601/602 loops back to the decision block 632 (i.e., it waits until at least one of the ongoing j-th cell's BCH symbols is ready).

When the ongoing j-th cell's BCH symbols are ready, then the method 601/602 continues by de-assigning the j-th cell fingers, Z_j=0, and creating the j-th cell's deinterleave job queue entry, as shown in a block 634.

As shown in a decision block 636, if it is determined whether it is the first entry in the j-th cell's deinterleave job queue. If it is, then the method 601/602 continues by moving to the operations described by B in FIG. 7. However, if it is not the first entry in the j-th cell's deinterleave job queue entry, then the method 601/602 continues by determining whether all M cell's symbols have been accumulated, as shown in a decision block 638. If they have all be been accumulated, then the method 601/602 continues by turning off the RF module, as shown in a block 640 and then returning to the decision block 620. Alternatively, if all M cell's symbols have not been accumulated, then the method 601/602 operates by returning to the decision block 620 (i.e., and by not turning off the RF module).

Referring again to the operations continuing with B from FIG. 6 and into FIG. 7, the method 601/602 continues by starting the deinterleaving on the next servicing cell in the queue, as shown in a block 642.

Referring again to the operations continuing with A from FIG. 6 and into FIG. 7, the method 601/602 continues by determining if all ongoing k-th cells' BCH symbols are deinterleaved, as shown in a decision block 644. If they are not all deinterleaved, the method 601/602 continues by returning to the decision block 644.

However, if all ongoing k-th cells' BCH symbols are deinterleaved, then the method 601/602 continues by creating the k-th cell Viterbi decoder job queue, as shown in a block 646.

As shown in a decision block 648, if it is determined whether it is the first entry in the k-th cell Viterbi decoder job queue. If it is not, then the method 601/602 continues by determining whether all M cell's symbols have been deinterleaved, as shown in a decision block 650. If they have all be deinterleaved, then the method 601/602 continues by turning off the hardware accelerator module, as shown in a block 652 and then returning to the block 642. Alternatively, if all M cell's symbols have not been deinterleaved, then the method 601/602 operates by returning to the block 642 (i.e., and by not turning off the hardware accelerator module).

Referring back to the decision block 648, if it is not the first entry in the k-th cell Viterbi decoder job queue, then the method 601/602 continues by starting the decoding on the next servicing cell in queue, as shown in a block 654.

The method 601/602 continues by determining if all ongoing k-th cells' BCH symbols are decoded, as shown in a decision block 656. If they are not all decoded, the method 601/602 continues by returning to the decision block 656.

However, if all ongoing k-th cells' BCH symbols are decoded, then the method 601/602 continues by deciphering and storing the cell's SFN offset, as shown in a block 658.

The method 601/602 continues by determining if all M cells' BCH symbols are decoded, as shown in a decision block 660. If they are not all decoded, the method 601/602 continues by returning to the block 654. However, if all of the M cells' BCH symbols are decoded, then the method 601/602 continues by turning off the host processor and entering the sleep period, as shown in a block 662.

Figure 8:
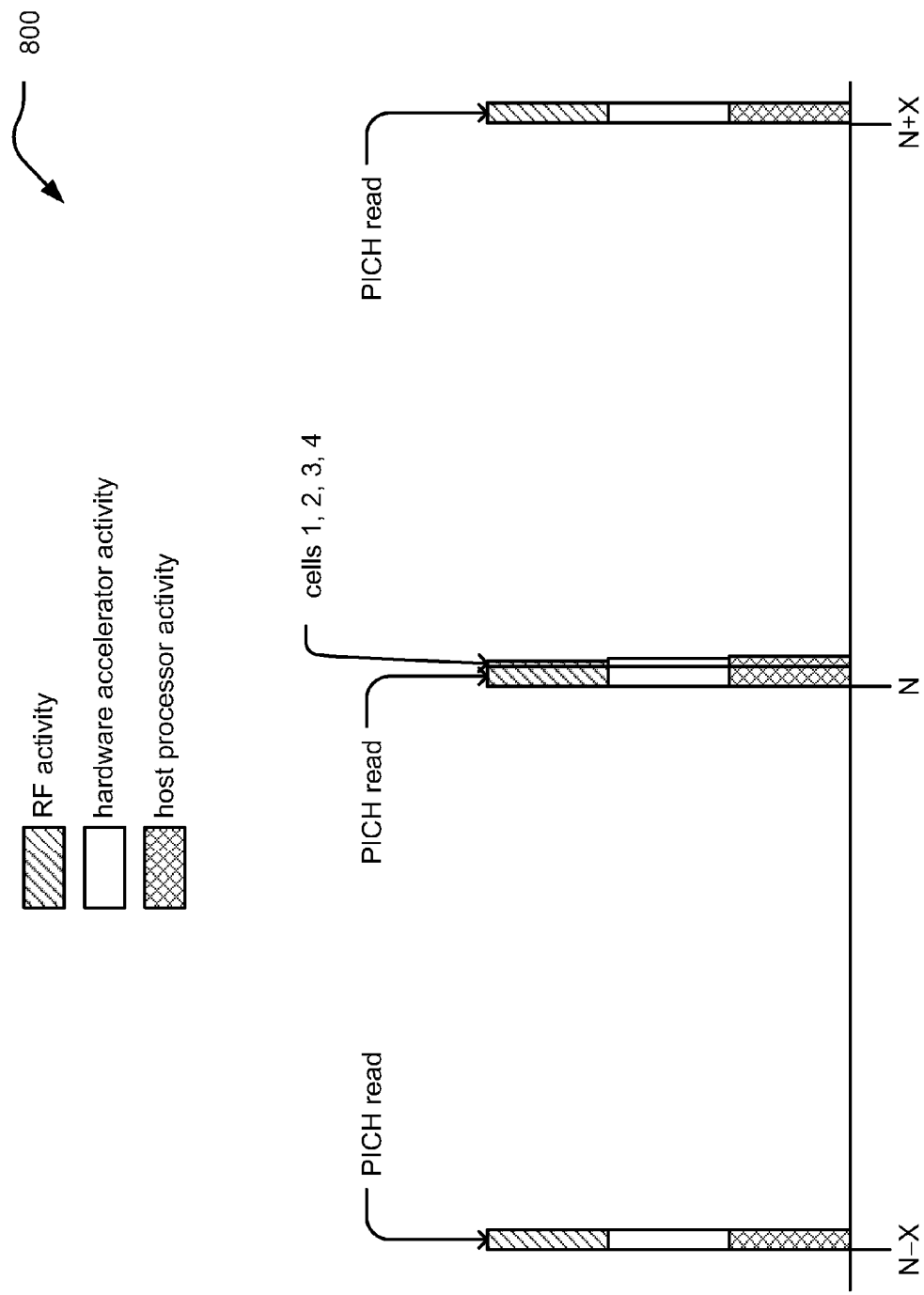
FIG. 8 is a diagram illustrating an alternative embodiment of timing diagram showing impact of SFN reads on a wireless communication device.

FIG. 8 is a diagram illustrating an alternative embodiment of timing diagram 800 showing impact of SFN reads on a wireless communication device. A deeper analysis of power consumption within a wireless communication device operating in accordance with the novel means presented herein results in a current profile similar to the one shown in this diagram. As can be seen, the RF circuitry is turned off the earliest, followed by hardware accelerators. In this embodiment, the host processor does the Viterbi decoding on the 4 cells in a time that is much shorter/smaller than is performed using existing approaches within the art. The host processor is the last one to be turned off after which the UE goes to sleep.

A sample scenario for the novel means effectuated using a wireless communication device 500 that operates in accordance with the method 601/602 of FIG. 6 and FIG. 7, (with known SFN offset, re-evaluation) of 4 servicing cells can be described to see a concrete example of the significant savings achieved herein.

With a total of 12 rake fingers, with serving cell requiring 4 rake fingers for PICH decoding, the UE still has 8 idle fingers. To exploit these 8 idle fingers to use same I/Q samples as those used by PICH fingers, this novel means presented herein provides a way of turning the RF module off much earlier. Assuming all 4 cells have an average of 2 multipaths each, the symbol accumulation for all 4 cells can be done by 8 available fingers in parallel with PICH read. The RF circuit needs to be ON for only 2-3 frames (depending on servicing cell's chip offsets). Further, the hardware accelerator and host processor need to be on for only a little longer than RF activity duration. In all, this sample scenario illustrates current savings of at least 5-6 frames compared to FIG. 4 for each of the three subsystems.

Figure 9:
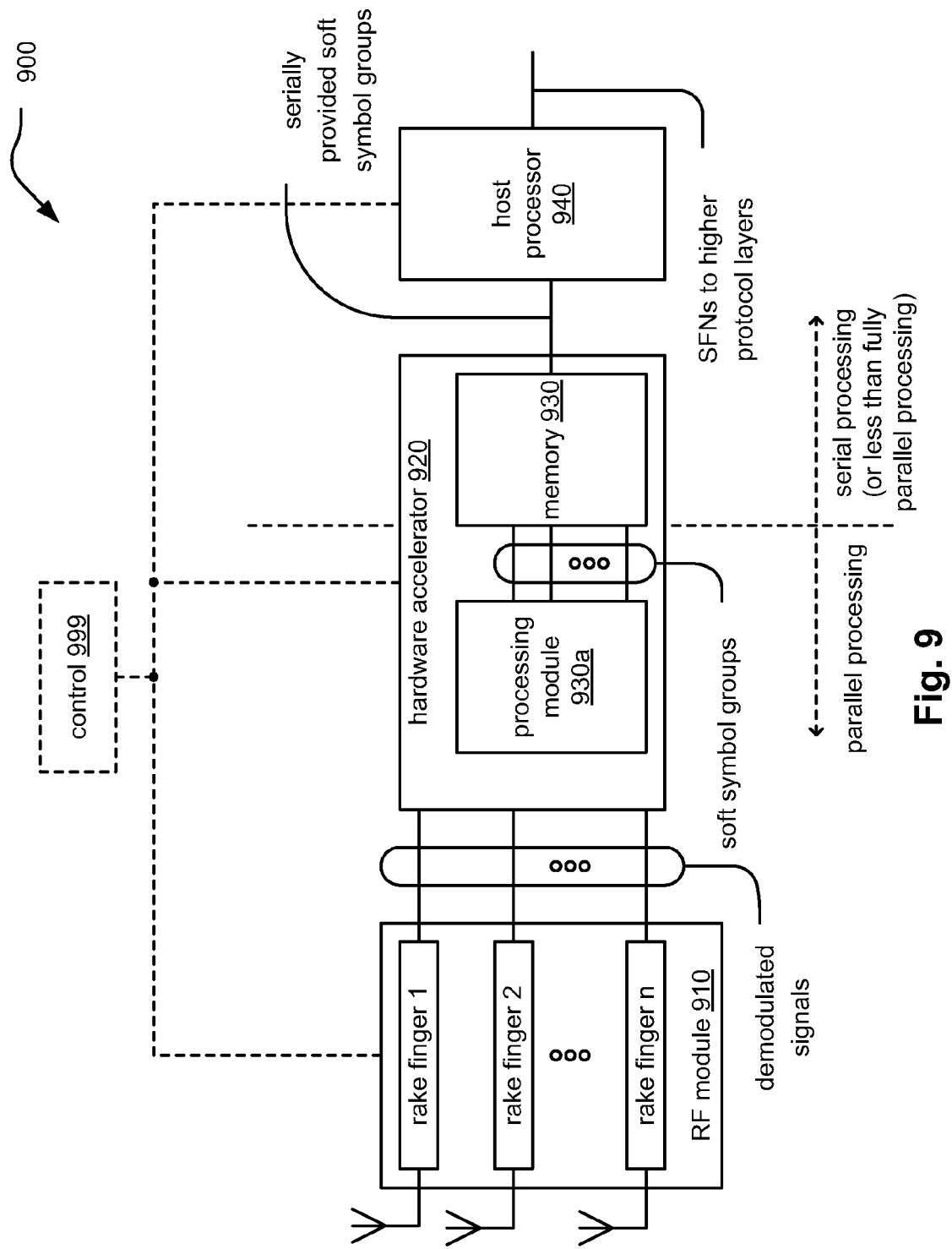
FIG. 9 is a diagram illustrating an alternative embodiment of a wireless communication device.

FIG. 9 is a diagram illustrating an alternative embodiment of a wireless communication device 900. As with other embodiments, the embodiment of this diagram also captures the three primary subsystems in a typical mobile station (i.e., wireless communication device): an RF module 910, a hardware accelerator module 920, and a host processor module 940.

This RF module 910 may be viewed as being an analog front end (AFE) module or a module that performs analog RF processing and may perform any of a variety of operations including any one of digital to analog conversion (e.g., sampling), gain adjustment, filtering, frequency conversion, etc.

A RF module 910 receives signals transmitted to the wireless communication device 500. The RF module 910 of this embodiment is coupled to one or more antennae. Within the RF module, each rake fingers (a number of rake fingers corresponding to the number of antennae) receive a signal from its respective antenna and produces a demodulated signal. Together, the rake fingers produce demodulated signals that are passed to a hardware accelerator module 920 that employs a processing module 930a therein to generate soft symbol groups that are stored in a memory module 930. Up to the point in which the soft symbol groups are stored in the memory module 930, the processing within the wireless communication device 900 is performed in accordance with parallel processing.

After the soft symbol groups are placed in the memory module 930, they are provided to a host processor module 940. The host processor module 940 performs serial Viterbi decoding of each of the soft symbol groups thereby generating broadcast channel transport blocks such that each broadcast channel transport block corresponds to one of the servicing cells with which the wireless communication device can communicate. The host processor module 940 also performs serial processing of the broadcast channel transport blocks thereby generating a system frame numbers (SFNs), for use in timing synchronization with respect to the servicing cells, such that each frame number corresponds to one of the servicing cells. The SFNs may then be passed to a higher protocol layer module.

In one embodiment, the RF module 910 is turned off after each of the soft symbol groups is stored in the memory module 930.

In one possible embodiment, a control module 999 is coupled to each of the RF module 910, the hardware accelerator module 920, and the host processor module 940. The control module 999 is operative to turn on each of the RF module, the hardware accelerator module 910 including the memory module 930 therein, and the host processor module 940 at a beginning of a wakeup period. The control module 999 is operative to turn off the RF module 910 after each of the soft symbol groups is stored in the memory module 930. The control module 999 is operative to turn off the hardware accelerator module 920 after the host processor module 940 has generated the broadcast channel transport blocks and the control module 999 is operative to turn off the memory module 930 and the host processor module 940 after the system frame numbers are generated and output to a higher protocol layer module.

Figure 10:
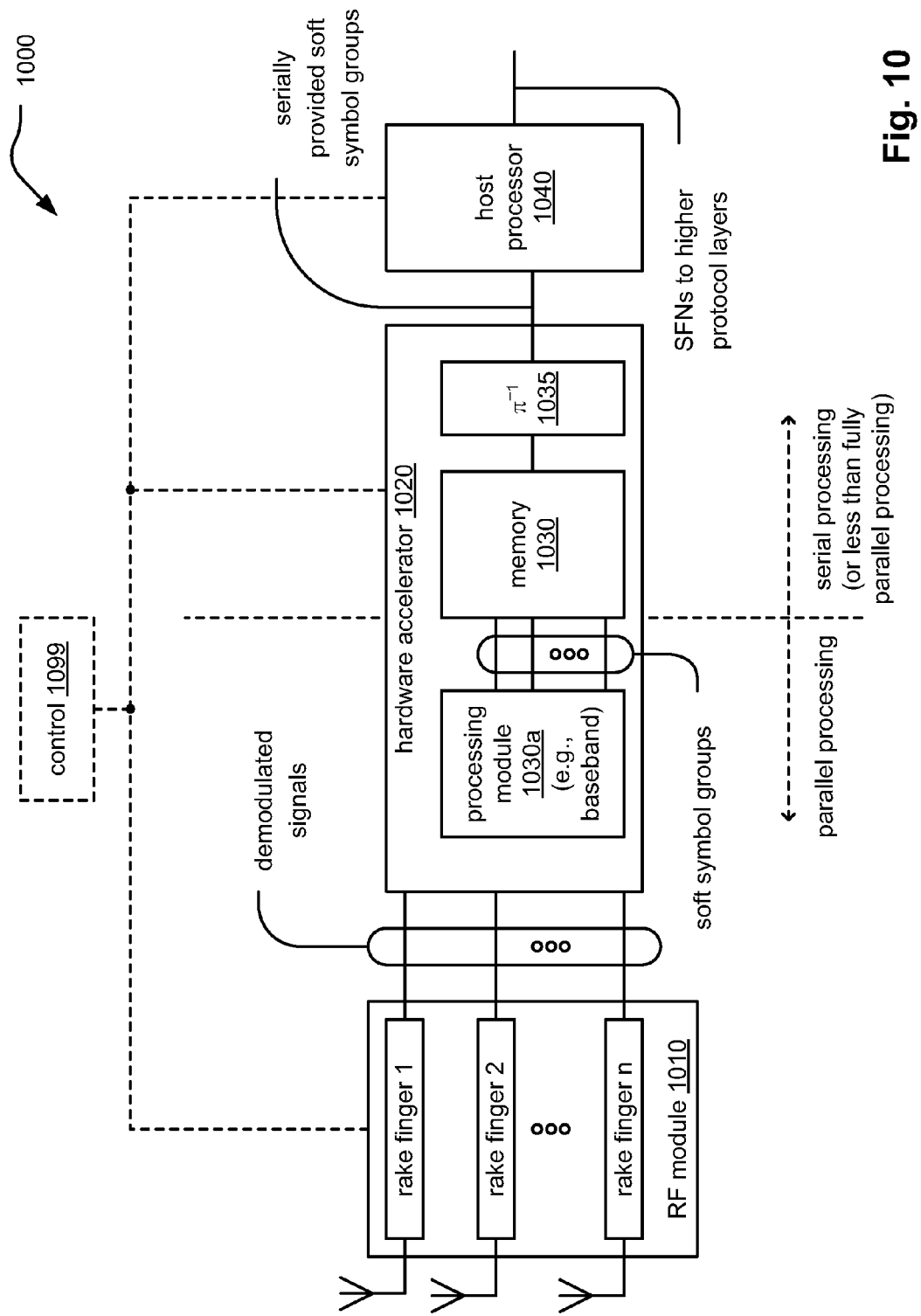
FIG. 10 is a diagram illustrating an alternative embodiment of a wireless communication device.

FIG. 10 is a diagram illustrating an alternative embodiment of a wireless communication device 1000. This embodiment is somewhat analogous to the previous embodiment (e.g., including a RF module 1010 having multiple rake fingers, a hardware accelerator 1020 that includes a processing module 1030, a memory module 1030a, and a host processor module 1040, etc.). At least one difference in this embodiment is a deinterleaver 1035 situated after the memory module 1030 within the hardware accelerator 1020.

In this embodiment, as within certain other embodiments described above, the paging indicator channel (PICH) does not require de-interleaving at all. Therefore, in this embodiment as with some others, for performing SFN decodes, the idle fingers of a rake finger configuration are employed in a concurrent fashion for individual cells, and enhanced control for a serial usage of de-interleaver 1035 is achieved for each cell.

Figure 11:
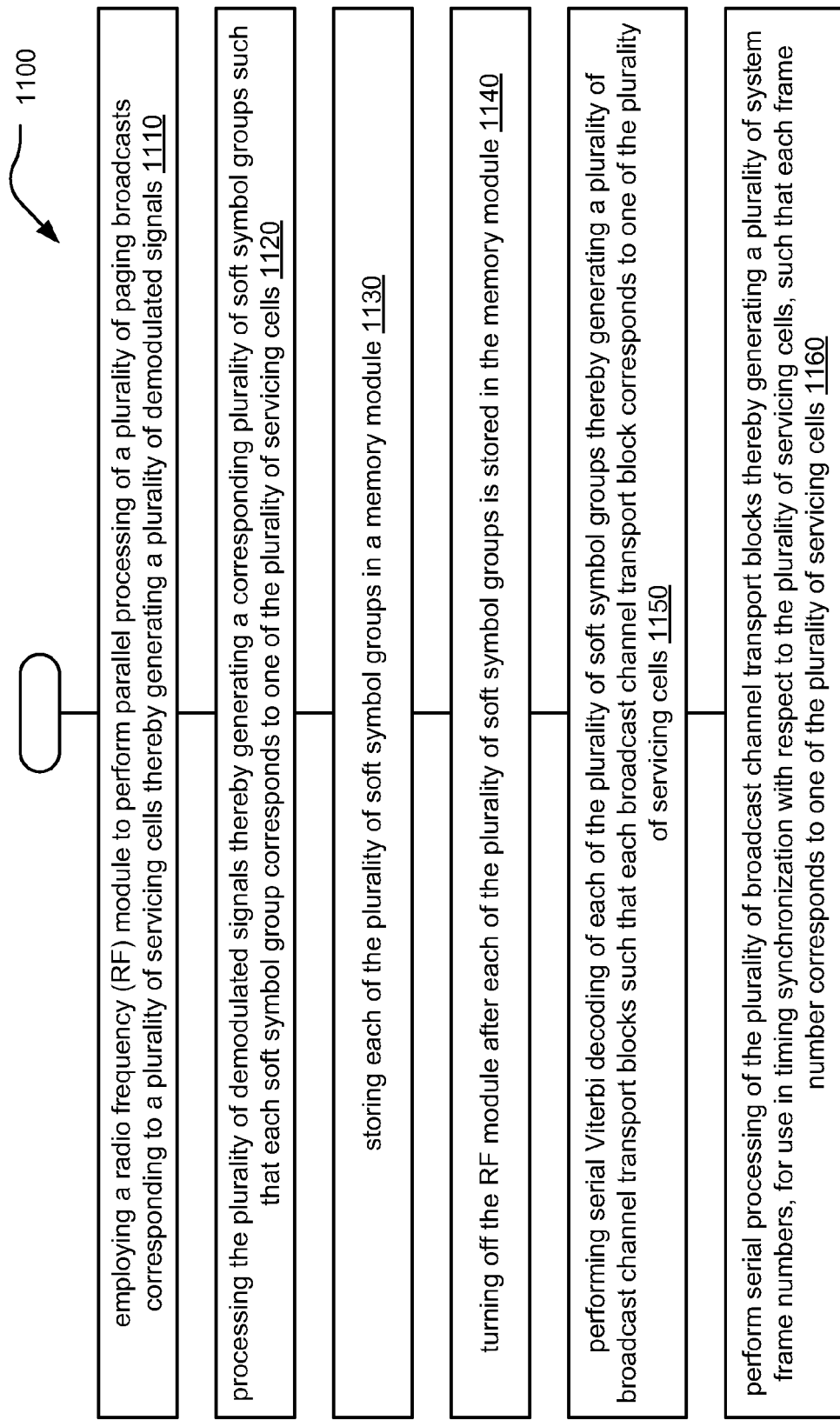
FIG. 11 and FIG. 12 are diagrams illustrating alternative embodiment of methods for performing SFN decoding on multiple servicing cells.
Figure 12:
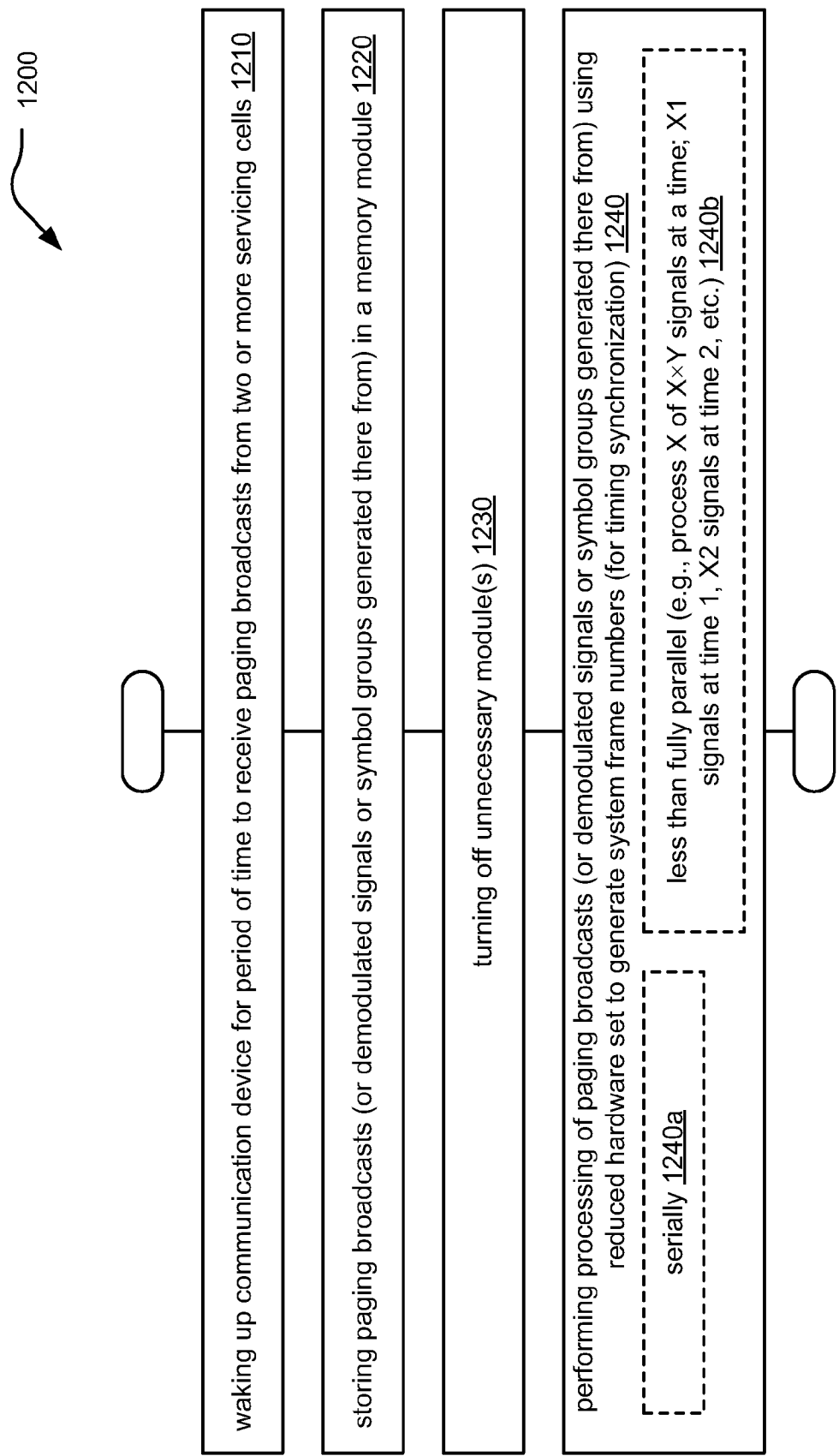

FIG. 11 and FIG. 12 are diagrams illustrating alternative embodiment of methods 1100 and 1200, respectively, for performing SFN decoding on multiple servicing cells.

Referring to method 1100 of FIG. 11, the method 1100 begins by employing a radio frequency (RF) module to perform parallel processing of a plurality of paging broadcasts corresponding to a plurality of servicing cells thereby generating a plurality of demodulated signals, as shown in a block 1110. The method 1100 continues by processing the plurality of demodulated signals thereby generating a corresponding plurality of soft symbol groups such that each soft symbol group corresponds to one of the plurality of servicing cells, as shown in a block 1120.

The method 1100 continues by storing each of the plurality of soft symbol groups in a memory module, as shown in a block 1130. The method 1100 continues by turning off the RF module after each of the plurality of soft symbol groups is stored in the memory module, as shown in a block 1140.

The method 1100 continues by performing serial Viterbi decoding of each of the plurality of soft symbol groups thereby generating a plurality of broadcast channel transport blocks such that each broadcast channel transport block corresponds to one of the plurality of servicing cells, as shown in a block 1150.

The method 1100 continues by perform serial processing of the plurality of broadcast channel transport blocks thereby generating a plurality of system frame numbers, for use in timing synchronization with respect to the plurality of servicing cells, such that each frame number corresponds to one of the plurality of servicing cells, as shown in a block 1160.

Referring to method 1200 of FIG. 12, the method 1200 begins by waking up communication device for period of time to receive paging broadcasts from two or more servicing cells, as shown in a block 1210. The method 1200 continues by storing paging broadcasts (or demodulated signals or symbol groups generated there from) in a memory module, as shown in a block 1220.

The method 1200 continues by turning off unnecessary module(s), as shown in a block 1230. The method 1200 continues by performing processing of paging broadcasts (or demodulated signals or symbol groups generated there from) using reduced hardware set to generate system frame numbers (for timing synchronization), as shown in a block 1240. The operations within the block 1240 can be performed serially, as shown in a block 1240a, or alternatively in a less than fully parallel manner as shown in a block 1240b. For example, a less than fully parallel processing manner (e.g., partially parallel) may be viewed as processing X of a total of X×Y signals at a time, or alternatively, processing X1 signals at time 1 followed by processing X2 signals at time 2, and so on).

In various of the embodiments presented herein, it is noted that certain of the less computationally intensive tasks (e.g., Viterbi decoding for broadcasted Signal) can either be performed in a hardware accelerator module or within a host processor module. In addition, other relatively less computationally intensive operations/blocks/modules may similarly be performed within a hardware accelerator module or within a host processor module.

Generally speaking, assuming that the wireless system's broadcasted information requires certain computationally intensive tasks and others being less intensive for decoding purposes, various means may be performed by storing the results of computationally relatively more intensive real-time operations and then performing post-processing on those stored results later in an off-line (or reduced hardware functionality set configuration) manner during Discontinuous Reception (DRX) mode may be performed.

By using certain aspects as presented herein, significant reduction in power consumption for the purpose of frame synchronization in wireless communication systems may be achieved, and particularly in DRX modes. From certain perspectives, this is facilitated by progressively powering-off specific components of a mobile station (wireless communication device) much earlier than that utilized by existing approaches within the art.

Faster processing of broadcasted frame synchronization information offered by the various means presented herein facilitate a much faster availability to higher layers and hence a reduced time in cell reselection scenarios, where reselections are contingent on earliest availability of frame synchronization information.

It is noted that the various modules (e.g., RF modules, baseband processing modules, memory modules, decoding modules, hardware accelerator modules, etc.) described herein may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory, random access memory, volatile memory, non-volatile memory, static memory, dynamic memory, flash memory, and/or any device that stores digital information. It is also noted that when the processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. In such an embodiment, a memory stores, and a processing module coupled thereto executes, operational instructions corresponding to at least some of the steps and/or functions illustrated and/or described herein.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. An apparatus, comprising:
   a radio frequency (RF) module to perform parallel processing of a plurality of paging broadcasts corresponding to a plurality of servicing cells to generate a plurality of demodulated signals;
   a hardware accelerator module, coupled to the RF module, to process the plurality of demodulated signals to generate a corresponding plurality of soft symbol groups such that each soft symbol group corresponds to one of the plurality of servicing cells, wherein the hardware accelerator module includes a memory module to store each of the plurality of soft symbol groups;
   a host processor module, coupled to the hardware accelerator module, to:
     perform serial Viterbi decoding of each of the plurality of soft symbol groups to generate a plurality of broadcast channel transport blocks such that each broadcast channel transport block corresponds to one of the plurality of servicing cells; and
     perform serial processing of the plurality of broadcast channel transport blocks to generate a plurality of system frame numbers, for use in timing synchronization with respect to the plurality of servicing cells, such that each frame number corresponds to one of the plurality of servicing cells; and
   a control module, coupled to the RF module, the hardware accelerator module, and the host processor module, to:

turn on each of the RF module, the hardware accelerator module, and the host processor module at a beginning of a wakeup period;

turn off the RF module after each of the plurality of soft symbol groups is stored in the memory module;

turn off the hardware accelerator module after the host processor module has generated the plurality of broadcast channel transport blocks; and turn off the memory module and the host processor module after the plurality of system frame numbers is generated and output to a higher protocol layer module.

2. The apparatus of claim 1, wherein:

the plurality of paging broadcasts received via a Paging Indicator Channel (PICH).

3. The apparatus of claim 1, wherein:

the hardware accelerator module further includes at least one of a descrambler, a despreader, a pilot filtering module, a rake combining module, and a deinterleaver module, to process the plurality of demodulated signals to generate the corresponding plurality of soft symbol groups.

4. The apparatus of claim 1, wherein:

the hardware accelerator module further includes a deinterleaver module and at least one other module;

the at least one other module to perform parallel processing of the plurality of demodulated signals to generate a processed plurality of demodulated signals; and the deinterleaver module to perform serial processing of the processed plurality of demodulated signals to generate the corresponding plurality of soft symbol groups.

5. The apparatus of claim 4, wherein:

the memory module to store each of the processed plurality of demodulated signals; and the deinterleaver module to retrieve serially the processed plurality of demodulated signals from the memory module in accordance with performing serial processing of the processed plurality of demodulated signals to generate the corresponding plurality of soft symbol groups.

6. The apparatus of claim 1, wherein:

the hardware accelerator module further includes a deinterleaver module that deinterleaves each of the plurality of soft symbol groups before outputting them to the host processor module.

7. The apparatus of claim 1, wherein:

the hardware accelerator module includes a plurality of rake fingers; and each of the plurality of rake fingers to process a respective one of the plurality of demodulated signals to generate a respective one of the corresponding plurality of soft symbol groups.

8. The apparatus of claim 7, wherein:

each of the plurality of rake fingers includes a respective at least one of a descrambler, a despreader, and a pilot filtering module to process the respective one of the plurality of demodulated signals to generate the respective one of the corresponding plurality of soft symbol groups.

9. The apparatus of claim 1, wherein:

the apparatus is operative within a wideband code division multiple access (WCDMA) communication system; and each of the plurality of servicing cells operates in accordance with WCDMA.

10. The apparatus of claim 1, wherein:

the apparatus is a wireless communication device; and the wireless communication device is a laptop host computer, a personal digital assistant host, a personal computer host, or a cellular telephone host.

11. An apparatus, comprising:

a radio frequency (RF) module to perform parallel processing of a plurality of paging broadcasts corresponding to a plurality of servicing cells to generate a plurality of demodulated signals;

a baseband processing module, coupled to the RF module, to perform parallel processing of the plurality of demodulated signals to generate a corresponding plurality of soft symbol groups such that each soft symbol group corresponds to one of the plurality of servicing cells;

a memory module, coupled to the baseband processing module, to store each of the plurality of soft symbol groups;

a deinterleaver module, coupled to the memory module, to perform serial processing of each soft symbol group to generate a corresponding plurality of deinterleaved soft symbol groups;

a host processor module, coupled to the deinterleaver module, to:

perform serial Viterbi decoding of each of the plurality of deinterleaved soft symbol groups to generate a plurality of broadcast channel transport blocks such that each broadcast channel transport block corresponds to one of the plurality of servicing cells; and perform serial processing of the plurality of broadcast channel transport blocks to generate a plurality of system frame numbers, for use in timing synchronization with respect to the plurality of servicing cells, such that each frame number corresponds to one of the plurality of servicing cells; and a control module, coupled to the RF module, the baseband processing module, the memory module, the deinterleaver module, and the host processor module, to:

turn on each of the RF module, the baseband processing module, the memory module, the deinterleaver module, and the host processor module at a beginning of a wakeup period;

turn off the RF module and the baseband processing module after each of the plurality of soft symbol groups is stored in the memory module;

turn off the memory module and the deinterleaver module after the host processor module has generated the plurality of broadcast channel transport blocks; and turn off the host processor module after the plurality of system frame numbers is generated and output to a higher protocol layer module.

12. The apparatus of claim 11, wherein:

the plurality of paging broadcasts received via a Paging Indicator Channel (PICH).

13. The apparatus of claim 11, wherein:

the RF module includes a plurality of rake fingers; and each of the plurality of rake fingers to process a respective one of the plurality of paging broadcasts to generate a respective one of the corresponding plurality of demodulated signals.

14. The apparatus of claim 11, wherein:

the baseband processing module includes a plurality of rake fingers; and each of the plurality of rake fingers to process a respective one of the plurality of demodulated signals to generate a respective one of the corresponding plurality of soft symbol groups.

15. The apparatus of claim 11, wherein:
the apparatus is operative within a wideband code division multiple access (WCDMA) communication system; and
each of the plurality of servicing cells operates in accordance with WCDMA.

16. The apparatus of claim 11, wherein:
the apparatus is a wireless communication device; and
the wireless communication device is a laptop host computer, a personal digital assistant host, a personal computer host, or a cellular telephone host.

17. A method, comprising:
employing a radio frequency (RF) module to perform parallel processing of a plurality of paging broadcasts corresponding to a plurality of servicing cells thereby generating a plurality of demodulated signals;
operating a hardware accelerator module for processing the plurality of demodulated signals thereby generating a corresponding plurality of soft symbol groups such that each soft symbol group corresponds to one of the plurality of servicing cells;
storing each of the plurality of soft symbol groups in a memory module;
turning off the RF module after each of the plurality of soft symbol groups is stored in the memory module;
operating a host processor for performing serial Viterbi decoding of each of the plurality of soft symbol groups thereby generating a plurality of broadcast channel transport blocks such that each broadcast channel transport block corresponds to one of the plurality of servicing cells;
perform serial processing of the plurality of broadcast channel transport blocks thereby generating a plurality of system frame numbers, for use in timing synchronization with respect to the plurality of servicing cells, such that each frame number corresponds to one of the plurality of servicing cells;
turning on each of the RF module, the hardware accelerator module, the memory module, and the host processor module at a beginning of a wakeup period;
turning off the RF module after each of the plurality of soft symbol groups is stored in the memory module;
turning off the hardware accelerator module after the host processor module has generated the plurality of broadcast channel transport blocks; and
turning off the memory module and the host processor module after the plurality of system frame numbers is generated and output to a higher protocol layer module.

18. The method of claim 17, wherein:
the plurality of paging broadcasts received via a Paging Indicator Channel (PICH).

19. The method of claim 17, wherein:
the method is performed within a communication device that is operative within a wideband code division multiple access (WCDMA) communication system; and
each of the plurality of servicing cells operates in accordance with WCDMA.

20. The method of claim 17, wherein:
the method is performed within a wireless communication device; and
the wireless communication device is a laptop host computer, a personal digital assistant host, a personal computer host, or a cellular telephone host.

* * * * *